Patented June 9, 1953

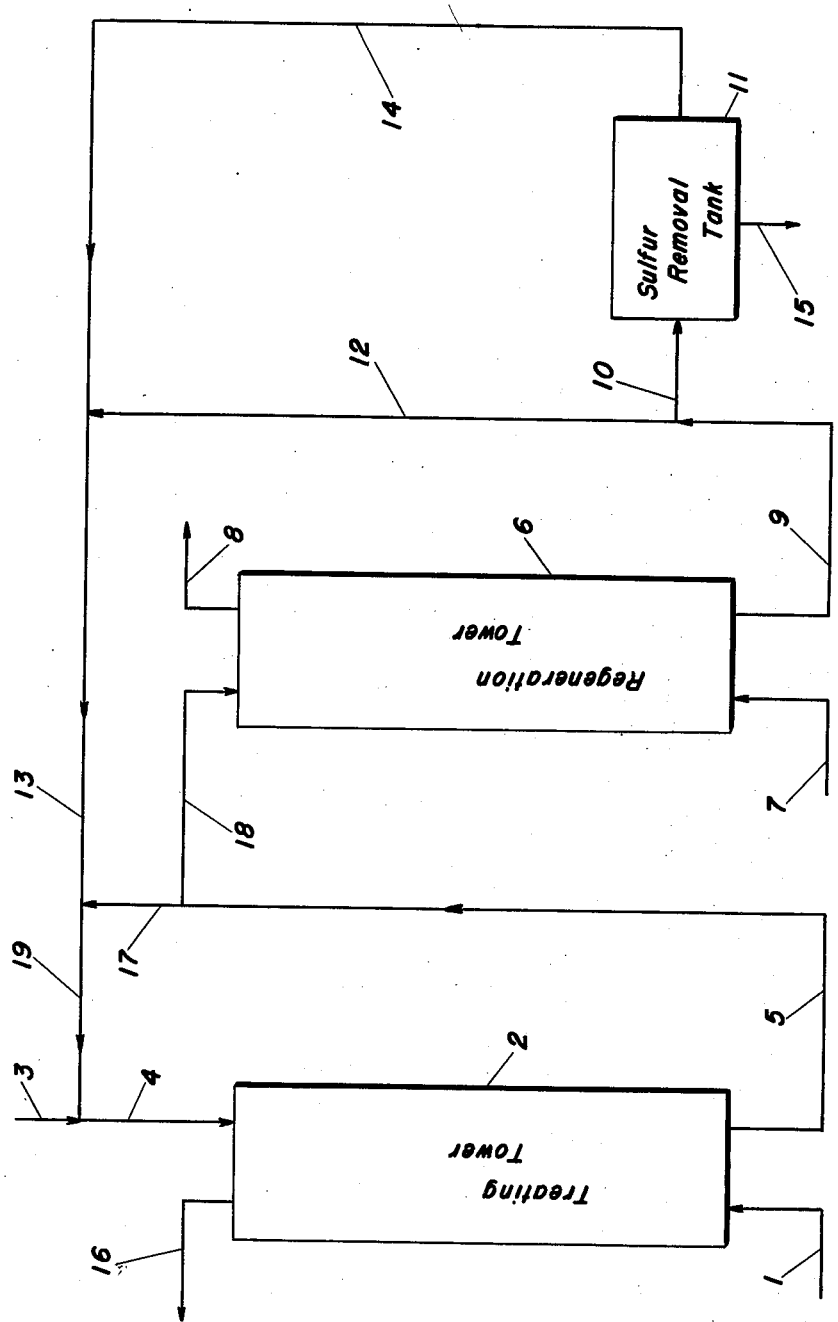

2,641,527

UNITED STATES PATENT OFFICE 2,641,527

RECOVERY OF SULFUR FROM GASES

Koerner E. Leutz, Toledo, Ohio, assignor to Sun Oil Company, Philadelphia, Pa., a corporation of New Jersey Application April 12, 1949, Serial No. 86,892

6 Claims. (Cl. 23—2)

This invention relates to the removal of hydrogen sulfide from gaseous mixtures. More particularly, it relates to the selective removal of hydrogen sulfide from gaseous mixtures containing the same and carbon dioxide.

Removal of hydrogen sulfide from gaseous mixtures has previously been accomplished by contacting such mixtures with metallic oxides in solid form or with alkaline solutions or suspensions. The use of solid masses has the disadvantage that, after such masses have become fouled with hydrogen sulfide, they are difficult to regenerate for further use. The use of alkaline aqueous materials has the disadvantage that such materials do not selectively remove hydrogen sulfide from gaseous materials containing carbon dioxide as well as hydrogen sulfide. Such materials remove carbon dioxide too, with the result that more of the material is required for a given amount of gas.

It is often the case that industrial gases contain varying quantities of carbon dioxide as well as hydrogen sulfide. An example is refinery hydrocarbon gases such as are derived from catalytic cracking operations. While it is desirable to remove hydrogen sulfide from these gaseous mixtures before they are used for other purposes, for example as fuel gas, it is not usually necessary or desirable to remove the carbon dioxide, because these gaseous mixtures have very high heating values even with carbon dioxide present. Therefore selective removal of hydrogen sulfide eliminates the extra expense of removing carbon dioxide.

I have discovered that hydrogen sulfide may be selectively and inexpensively removed from mixtures containing the same and carbon dioxide by contacting such mixtures with an aqueous solution of a soluble iron salt having a weakly acidic anion, the pH of the solution being within the range 4–7.

A soluble salt, as the term is here used, signifies a salt having solubility in water greater than 10 grams per liter at ordinary temperatures without heating. A weakly acidic anion, as the term is here used, signifies an anion which forms with hydrogen an acid having a dissociation constant less than $10^{-2}$. Examples of suitable solutes are ferrous acetate, ferric formate, ferrous lactate, and ferrous tartrate, but other such soluble iron salts having weakly acidic anions are also suitable.

This invention is particularly well adapted to gas purification in a cyclic process wherein the aqueous treating solution, in a purification stage, contacts a gaseous mixture and removes hydrogen sulfide therefrom, and, in a regeneration stage, contacts a free-oxygen containing gas which renders it capable of purifying more of the gaseous mixture. During the purification stage, an iron sulfide precipitate is formed in the treating agent. During the regeneration stage, free sulfur is formed in the treating agent, probably through oxidation of iron sulfide, causing the iron to go back into solution, and may be removed therefrom by certain suitable methods. This removal is rendered relatively quite easy by the rather surprising fact that the regeneration by oxidation can be so regulated that no substantial amount of undissolved solids other than free sulfur remains in the regenerated solution; and therefore, that sulfur can be removed from the solution by a mechanical separation of solids from liquids, e. g. filtration or settling and decantation, without substantial loss of the active ingredients of the treating solution. The method of the invention therefore possesses an important advantage over other methods in which the treating agent is itself a suspension of solids in water and in which some undissolved solids other than free sulfur are always present in the treating agent. In such methods, removal of sulfur by mechanical separation of solids from liquids would result in substantial losses of solids which are active ingredients of the treating agent.

The pH of the treating agent must be within the range 4–7. Below the lower limit of this range, the treating agent becomes unduly corrosive and its holding capacity for hydrogen sulfide decreases to a degree such that the operation is no longer commercially feasible. Above a pH of 7, carbon dioxide begins to be absorbed by the mixture to an undesirable degree.

It has been found that the pH of the treating agent decreases during the purification stage, probably because of the formation of weak acid in the solution, and increases during the regeneration stage, probably because of formation of water from the weak acid. These contrary pH effects can be made to balance each other, with the result that in cyclic operation the pH and, apparently, the composition of the regenerated treating agent are approximately the same after each cycle.

Any concentration of the iron salt in the solution may be used. From an economic standpoint, it is preferred to use a concentration within the range 50–200 grams per liter.

The temperature at which the purification stage is carried out has little or no effect on the amount of hydrogen sulfide removed. By increasing the temperature of regeneration, however, from, for example, 70° F. to 115° F., the rate of regeneration may be approximately doubled.

Aqueous solutions of ferrous acetate, having pH within the range 4-7, have been found to be particularly good treating agents according to the invention. It has been found possible to regenerate such solutions containing precipitated iron sulfide by oxidation without producing any substantial amount of the insoluble ferric basic acetate. If the oxidation is continued too long, ferric basic acetate will be formed. This compound will react with hydrogen sulfide in a subsequent purification stage, but, of course, removal of sulfur by filtration or settling is not feasible when substantial amounts of the basic acetate precipitate are present in the solution. A preferred embodiment of the invention is one in which a filtration or settling step is used for separation of sulfur and is preceded by a regeneration stage in which no substantial amount of ferric basic acetate is formed. Choice of the regeneration variables, i. e. oxygen rate, temperature, time of oxidation, type of contact, etc., in order to prevent substantial formation of ferric basic acetate is within the ability of a person skilled in the art.

For purposes of illustration, an embodiment of the invention is shown on the accompanying drawing, in which the figure is a diagrammatic view of an apparatus for removing hydrogen sulfide from gaseous mixtures.

The impure gaseous mixture to be treated is introduced through an inlet 1 into the base of a treating tower 2. The gas flows upwardly through the treating tower 2 where it is intimately contacted with a descending stream or spray of aqueous treating agent. The treated gas leaves the tower through an outlet 16 for storage or further use.

The treating agent is made up and its pH adjusted to a value within the range 4-7, preferably at least somewhat above the lower limit of that range, in order that contact with hydrogen sulfide early in the purification stage will not render the pH inoperatively low for the remainder of the purification stage. The treating agent is introduced through lines 3 and 4 into the top of the treating tower 2, wherein it descends, intimately contacting the gases to be treated, which are flowing upwardly through the tower. The fouled treating agent is removed from the base of the treating tower 2 through line 5 and is conducted through line 18 to the top of the regeneration tower 6, wherein the treating agent is intimately contacted with a free-oxygen containing gas, e. g. air, for regeneration purposes.

The regeneration air is introduced through line 7 into the base of the regeneration tower 6. The air flows upwardly through the tower, intimately contacting the fouled treating agent which flows downwardly through the tower. The air is discharged from the tower into the atmosphere through line 8. The revivified treating agent is removed from the base of the regeneration tower 6 through line 9 and passes either through line 10 to sulfur removal apparatus 11 or through lines 12, 13, 19, and 4 to the top of treating tower 2 again. Regenerated treating agent which passes through sulfur removal tank 11 has its free sulfur content removed therein. The sulfur-free regenerated treating agent passes from sulfur removal tank 11 through lines 14, 13, 19, and 4 to the top of treating tower 2. Sulfur which has been removed from the treating agent is removed from sulfur removal tank 11 through line 15.

Where the regeneration is conducted in such a way that substantially all of the iron sulfide precipitate is converted to free sulfur and without forming, in the case of a ferrous acetate treating agent, any substantial amount of solid ferric basic acetate, sulfur removal apparatus 11 may conveniently be a settling tank or a filter. If the regenerated treating agent contains other solids in substantial amount, other apparatus may be used, e. g. a solvent extraction system or flotation apparatus wherein the regenerated treating agent is agitated with a gas under conditions such that the sulfur becomes concentrated in a layer of foam above the treating agent.

If desired, regeneration tower 6 may be bypassed by directing all or part of the fouled treating agent in line 5 through lines 17, 19, and 4 to the top of treating tower 2. Such operation may be desirable in cases where it is wished to obtain additional control over the degree of oxidation of the treating agent passing through lines 19 and 4 beyond that which is obtained by control of conditions within regeneration tower 6.

Either or both the treating tower 2 and the regeneration tower 6 can be of a type common in industrial usage. Any satisfactory method for insuring intimate contacting of the gas and treating agent may be employed, such for instance as spray nozzles, bubble cap plates, or packing the towers with Raschig rings or the like. The only requirement is that sufficient contact time and surface be provided to effect the desired results.

From the above description, it will be apparent that I have produced a simple and efficient method for removing hydrogen sulfide from gaseous mixtures without substantially decreasing the carbon dioxide content of the mixtures. An important feature resides in controlling the pH of the solution employed in treating the gases in order to prevent substantial absorption of carbon dioxide, and a further important feature is that the process may be so operated that the regenerated treating agent contains no substantial amount of solids other than free sulfur, thus allowing removal of the latter from the treating agent by a mechanical separation of solids from liquids.

The following example illustrates the invention:

*Example*

A 0.5 molar solution of ferrous acetate was prepared and found to have a pH of about 5.4. An acidic gas containing about 3 volume percent carbon dioxide and about 1 volume percent hydrogen sulfide was bubbled through the solution until the latter had absorbed about 4 grams of hydrogen sulfide per liter of solution and had a pH of about 4.2. The treated gas was substantially free of hydrogen sulfide, but its carbon dioxide content was virtually unchanged.

Air was bubbled through the fouled treating agent containing precipitated ferrous sulfide to regenerate the treating agent. At the end of this regeneration stage, the pH of the mixture was about 5.4. The remaining precipitate was removed from the regenerated solution by filtration and was found to be mainly sulfur, the iron content of the precipitate being equivalent to only about 0.4% of the iron content of the treating agent.

Subsequent purification stages each reduced the pH of the treating agent to about 4.2, and subsequent regenerations raised the pH to about 5.4.

In the above example, the 4 grams per liter of hydrogen sulfide absorbed does not represent the full equilibrium capacity of the treating agent of the invention. In other experiments wherein air containing varying amounts of hydrogen sulfide was allowed to come to equilibrium with a 0.5 molar ferrous acetate solution at 70° F. and atmospheric pressure, it was found that such a solution will quantitatively absorb hydrogen sulfide from the air until the hydrogen sulfide concentration in the solution reaches 10 grams per liter.

In my copending application Serial No. 86,891, filed April 12, 1949, there is disclosed and claimed a process for selective removal of hydrogen sulfide from a gaseous mixture containing the same and carbon dioxide by treating the gaseous mixture with an aqueous suspension of precipitated iron hydroxide including ferrous hydroxide, the suspension having a pH within the range 4-7.

I claim:

1. A process for the selective removal of hydrogen sulfide from a gaseous mixture containing the same and carbon dioxide which comprises treating said gaseous mixture with a treating agent consisting essentially of water and, dissolved therein, an iron salt soluble in water and having a weakly acidic, organic anion, said treating agent being acidic and having a pH within the range 4-7; and continuing the treatment until a precipitate of insoluble iron sulfide is formed.

2. A process according to claim 1 wherein said soluble salt is ferrous acetate.

3. A process for the selective removal of hydrogen sulfide from a gaseous mixture containing the same and carbon dioxide which comprises treating said gaseous mixture with a treating agent consisting essentially of water and, dissolved therein, an iron salt soluble in water and having a weakly acidic, organic anion, said treating agent being acidic and having a pH within the range 4-7; continuing the treatment until a precipitate of insoluble iron sulfide is formed and contacting the fouled treating agent resulting from such treatment with a free-oxygen containing gas to effect revivification.

4. A process according to claim 3 wherein the solids in the revivified solution resulting from oxidation with a free-oxygen containing gas, said solids consisting mainly of free sulfur, are mechanically separated from said solution.

5. A process for the selective removal of hydrogen sulfide from refinery fuel gas or the like containing the same and carbon dioxide which comprises treating said gaseous mixture with an aqueous treating agent consisting essentially of water and ferrous acetate dissolved therein, said treating agent being acidic and having a pH within the range 4-7; continuing the treatment until a precipitate of insoluble iron sulfide is formed and contacting the fouled treating agent resulting from such treatment with a free-oxygen containing gas to effect revivification.

6. A process for the selective removal of hydrogen sulfide from refinery fuel gas or the like containing the same and carbon dioxide which comprises: treating such gas with an aqueous treating agent consisting essentially of water and ferrous acetate dissolved therein, said treating agent being acidic and having a pH within the range 4-7; continuing the treatment until a precipitate of insoluble iron sulfide is formed; contacting the fouled treating agent resulting from such treatment with a free-oxygen containing gas until the revivified treating agent contains solids comprising mainly sulfur; mechanically separating said solids from said revivified treating agent; and reusing the revivified agent from which solids have been separated for further treatment of such gas.

KOERNER E. LEUTZ.

References Cited in the file of this patent

UNITED STATES PATENTS

| Number | Name | Date |
|---|---|---|
| 1,510,342 | Rambush | Sept. 30, 1924 |
| 1,700,698 | Fulweiler | Jan. 29, 1929 |
| 1,708,590 | Reeson | Apr. 9, 1929 |
| 1,847,795 | Thorsell | Mar. 1, 1932 |
| 1,854,491 | Sperr | Apr. 19, 1932 |
| 1,995,545 | Leahy | Mar. 26, 1935 |
| 2,028,125 | Shaw | Jan. 14, 1936 |
| 2,143,393 | Ulrich | Jan. 10, 1939 |
| 2,557,643 | Fetterly | June 19, 1951 |
| 2,616,834 | Leutz | Nov. 4, 1952 |

OTHER REFERENCES

Mellor, "Comp. Treat. on Inorg. and Theoretical Chem.," vol. 14, page 145, 1935, Longmans, Green and Co., N. Y.